(12) United States Patent
Lee et al.

(10) Patent No.: US 7,642,006 B2
(45) Date of Patent: Jan. 5, 2010

(54) SECONDARY BATTERY MODULE

(75) Inventors: Gun-Goo Lee, Suwon-si (KR);
Yoon-Cheol Jeon, Suwon-si (KR);
Tae-Yong Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 722 days.

(21) Appl. No.: 11/269,020

(22) Filed: Nov. 7, 2005

(65) Prior Publication Data

US 2006/0115714 A1    Jun. 1, 2006

(30) Foreign Application Priority Data

Nov. 29, 2004   (KR) ................ 10-2004-0098550
Nov. 29, 2004   (KR) ................ 10-2004-0098551

(51) Int. Cl.
*H01M 10/50*     (2006.01)
(52) U.S. Cl. .................. 429/163; 429/420; 138/103; 138/38; 138/40; 138/42
(58) Field of Classification Search ............. 429/163; 138/103
See application file for complete search history.

(56) References Cited

U.S. PATENT DOCUMENTS

| | | | | | |
|---|---|---|---|---|---|
| 3,572,391 | A | * | 3/1971 | Hirsh | ............ 138/40 |
| 3,994,153 | A | * | 11/1976 | Gussman et al. | ............ 73/1.25 |
| 5,879,833 | A | | 3/1999 | Yoshii et al. | |
| 6,225,788 | B1 | * | 5/2001 | Kouzu et al. | ............ 320/150 |
| 7,297,438 | B2 | * | 11/2007 | Kimoto | ............ 429/120 |

FOREIGN PATENT DOCUMENTS

| | | |
|---|---|---|
| CN | 1351387 A | 5/2002 |
| EP | 1 202 359 A2 | 5/2002 |
| JP | 10-270095 | 10/1998 |
| JP | 11-329515 | 11/1999 |
| JP | 2000-133225 | 5/2000 |
| JP | 2002-141113 | 5/2002 |
| JP | 2002-367684 | 12/2002 |
| JP | 2002-373709 | 12/2002 |

OTHER PUBLICATIONS

Patent abstracts of Japan for publication No. 2002-373709 dated Dec. 26, 2002 in the name of Yoshimitsu Inoue, et al.
Patent Abstracts of Japan for Publication No. 2002-141113; Date of publication of application May 17, 2002, in the name of Oda Takashi et al.

* cited by examiner

*Primary Examiner*—Dah-Wei D Yuan
*Assistant Examiner*—Patricia Davis
(74) *Attorney, Agent, or Firm*—Christie, Parker & Hale, LLP

(57) ABSTRACT

A secondary battery module includes a unit battery pack having a plurality of unit batteries arranged at predetermined intervals, and a housing having the unit battery pack disposed in the housing. A heat transfer medium for controlling temperature of the plurality of unit batteries circulates in the housing. A first dispersion plate is fixedly disposed in the housing so as to be adjacent to the unit battery pack, and distributes the heat transfer medium between the plurality of unit batteries. A second dispersion plate is slidably disposed on the first dispersion plate, and distributes the heat transfer medium between the plurality of unit batteries.

29 Claims, 12 Drawing Sheets

SECONDARY BATTERY MODULE

CROSS-REFERENCE TO RELATED APPLICATION

This application claims priorities to and the benefit of Korean Patent Application Nos. 10-2004-0098550 and 10-2004-0098551 filed with the Korean Intellectual Property Office on Nov. 29, 2004, the entire contents of which are incorporated herein by reference.

BACKGROUND OF THE INVENTION

1. Technical Field

The present invention relates to a secondary battery module, and more particularly, to a cooling structure of a secondary battery module constructed by connecting a plurality of unit batteries.

2. Related Art

Generally, unlike a primary battery which is not rechargeable, a secondary battery is capable of being charged and discharged. A low-capacity secondary battery composed of a single battery cell is used as a power source for various small portable electronic devices such as cellular phones, notebook computers, and camcorders. A high-capacity secondary battery in which a plurality of battery cells are connected to each other in a pack structure is used as a power source for driving a motor of a hybrid electric vehicle (HEV).

Secondary batteries are manufactured in various shapes. Generally, secondary batteries may be classified as a cylindrical shape battery or a prismatic shape battery, depending on the external shape of the battery.

By serially connecting such secondary batteries, a high-capacity secondary battery is constructed to be used as a power source for driving a motor in equipment such as an electric vehicle, which needs high power.

In this way, one high-capacity secondary battery (hereinafter referred to as a 'battery module' throughout the specification) is composed of a plurality of secondary batteries (hereinafter referred to as 'unit batteries' throughout the specification) which are generally connected in series.

Each of the unit batteries includes an electrode assembly having a positive electrode, a negative electrode, and a separator interposed therebetween, a case having a space for accommodating the electrode assembly, a cap assembly combined with the case to seal the case, and positive and negative terminals protruding upward from the cap assembly and electrically connected to positive and negative collectors provided in the electrode assembly.

When prismatic batteries are used as the unit batteries, in order to construct a battery module, the unit batteries are generally alternately arranged, and the positive and negative terminals are serially connected such that the positive and negative terminals which protrude upward from the cap assembly alternate relative to positive and negative terminals of another unit battery adjacent thereto.

One battery module includes a plurality of unit batteries. For this reason, it is important that the heat generated in the respective unit batteries can be easily radiated. In particular, when the secondary battery is applied to an HEV, it is important to satisfy these conditions first.

Further, when the heat cannot be efficiently radiated, the heat generated in the respective unit batteries causes an increase in the temperature of the battery module, which results in malfunction of an apparatus to which the battery module is applied.

In particular, when an HEV battery module for a vehicle is used, the battery module is charged and discharged with large currents. For this reason, depending on how the battery module is being used, heat is generated by an internal reaction in the secondary batteries, which deteriorates battery performance.

Therefore, generally, when a battery module includes a plurality of secondary batteries, more particularly, when the battery module includes prismatic secondary batteries, a battery barrier rib is provided between the unit batteries so as to maintain a gap between the unit batteries. The gap is provided for a heat transfer medium to circulate between the unit batteries. Further, these unit batteries are inside a housing, whereby the heat transfer medium for controlling the temperature of the unit batteries is provided in the housing. Thus, the heat generated in the respective unit batteries is cooled by circulating the heat transfer medium through the battery barrier rib.

However, in such a conventional cooling method, the circulating quantity of the heat transfer medium does not stay constant due to the inflow structure of the heat transfer medium of the housing. This is due to a driving condition of the battery module, a flow condition of the heat transfer medium, and a climate condition generating temperature variations between the respective unit batteries. Accordingly, the heat generated in the respective unit batteries is not evenly radiated, which results in a decrease of charging and discharging efficiency.

In addition, in this conventional cooling method, since the flow quantity of the heat transfer medium which circulates through the battery barrier ribs between the respective unit batteries does not stay constant, temperature variations between the respective unit batteries are generated. Accordingly, the heat generated in the respective unit batteries is not evenly dissipated, which results in a decrease of charging and discharging efficiency.

SUMMARY OF THE INVENTION

Therefore, various embodiments of the present invention have been made to solve the above-described problems, and to provide a secondary battery module having a structure which enables a constant quantity of a heat transfer medium to smoothly circulate between unit batteries.

According to one aspect of the present invention; a secondary battery module includes a unit battery pack having a plurality of unit batteries disposed at predetermined intervals, and a housing having the unit battery pack disposed therein. A heat transfer medium for controlling temperature of the plurality of unit batteries circulates in the housing. A flow control unit controls a flow quantity of the heat transfer medium circulating between the respective batteries and is disposed in the housing.

In the battery module according to this aspect of the invention, the unit battery pack includes battery barrier ribs which separate the respective unit batteries from each other, and circulation paths for passing the heat transfer medium therethough formed in the battery barrier ribs.

A battery module according to an aspect of the invention includes a flow control unit made of a plate member having nozzle holes with a size gradually increasing in a direction from the center of the housing to the periphery of the housing.

Further, in the battery module according to this aspect of the invention, a constant quantity of the heat transfer medium can be supplied into the circulation paths between the respective unit batteries by adjusting the size of the nozzle holes.

In addition, according to another aspect of the present invention, a secondary battery module includes a unit battery pack having a plurality of unit batteries arranged at predetermined intervals, and a housing having the unit battery pack built therein. A heat transfer medium for controlling temperature of the respective unit batteries circulates in the housing. A first dispersion plate is fixedly disposed in the housing so as to be adjacent to the unit battery pack, and it distributes the heat transfer medium between the respective unit batteries. A second dispersion plate, which is slidably disposed on the first dispersion plate, distributes the heat transfer medium between the respective unit batteries.

The housing may further include an inflow part for allowing the heat transfer medium to flow in the unit battery pack in an inflow direction and an outflow part for discharging the heat transfer medium which has passed through the respective unit batteries in a discharge direction. The inflow direction of the heat transfer medium coincides with the discharge direction of the heat transfer medium.

In another aspect of the invention, the inflow part is formed such that a sectional area of the flow of the heat transfer medium gradually increases toward the unit battery pack. A flow velocity of the heat transfer medium flowing through the inflow part may gradually decrease in a direction from a center portion of the unit battery pack to the periphery of the unit battery pack.

Further, in a battery module according to an aspect of the invention, each of the unit batteries is formed in a prismatic shape, and the first and second dispersion plates are formed in a rectangular shape. In this embodiment, the second dispersion plate overlaps the first dispersion plate so as to slide back and forth on the first dispersion plate in a width or a length direction of the first dispersion plate.

The housing may have a guide member for guiding the movement of the second dispersion plate.

The first and second dispersion plates may be provided with a plurality of nozzle holes for passing therethrough the heat transfer medium flowing through the inflow part. The size of the nozzle holes gradually increases in a direction from a center of a flow of the heat transfer medium to a periphery of the flow. The size of the nozzle holes may gradually increase in a direction from the center portion of the unit battery pack to the outside of the unit battery pack.

The size of the respective nozzle holes may vary depending on the movement of the second dispersion plate.

Each of the unit batteries may be formed in a cylindrical shape. In one embodiment, the unit battery pack includes a circular package part for packaging the unit batteries. Further, the first and second dispersion plates are formed in a circular shape which corresponds to the package part, and the second dispersion plate overlaps the first dispersion plate so as to slide on the first dispersion plate in a circumference direction of the first dispersion plate.

BRIEF DESCRIPTION OF THE DRAWINGS

These and/or other aspects and features of embodiments of the invention will become apparent and more readily appreciated from the following description, taken in conjunction with the accompanying drawings in which.

DESCRIPTION OF THE EMBODIMENTS

Hereinafter, embodiments of the invention will be described in detail with reference to the accompanying drawings such that the invention can be carried out by a person skilled in the art. However, the invention is not limited to the embodiments, but various modifications can be implemented.

Figure 1:
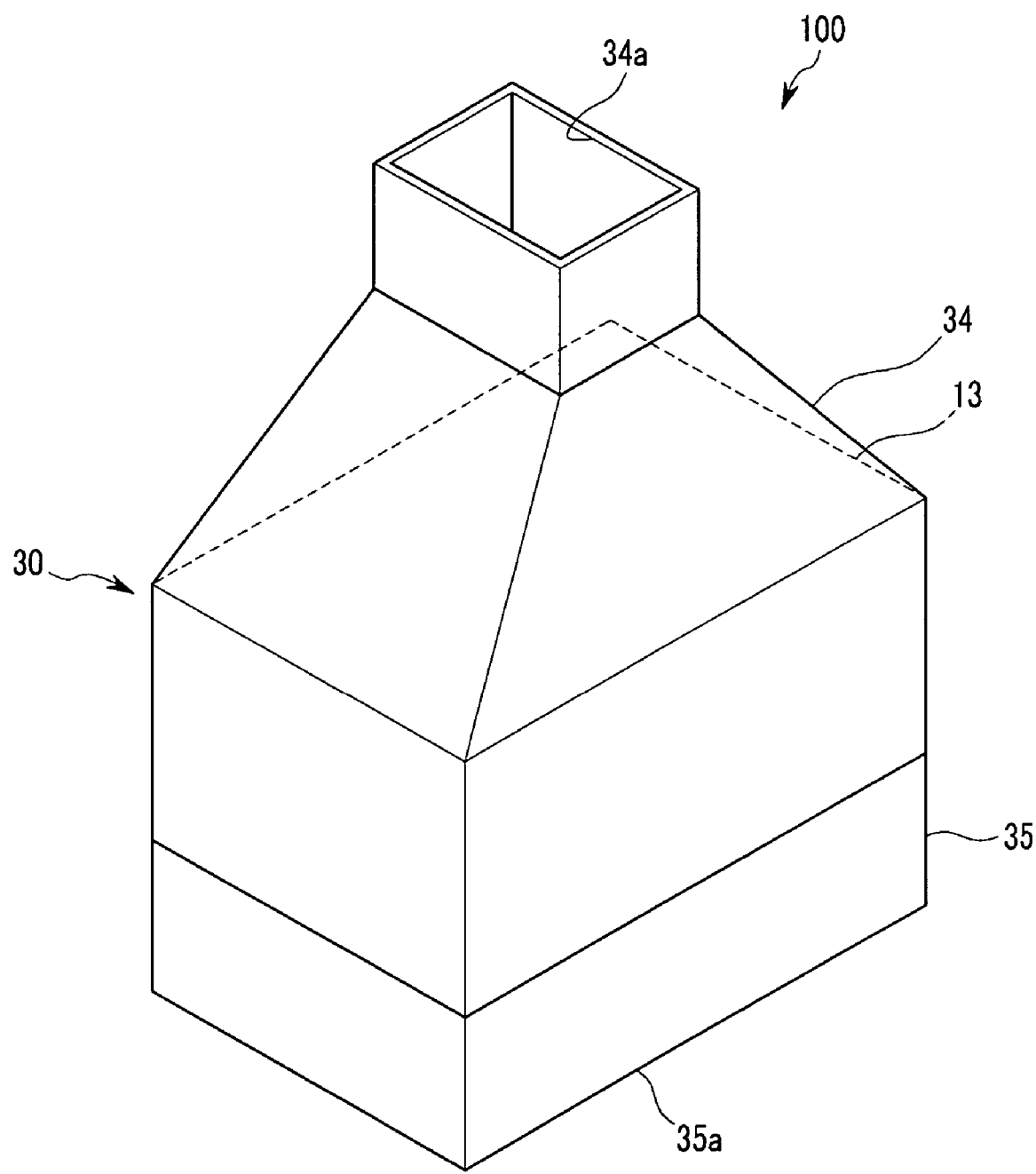
FIG. 1 is a perspective view of the external appearance of a battery module according to an embodiment of the present invention.
Figure 2:
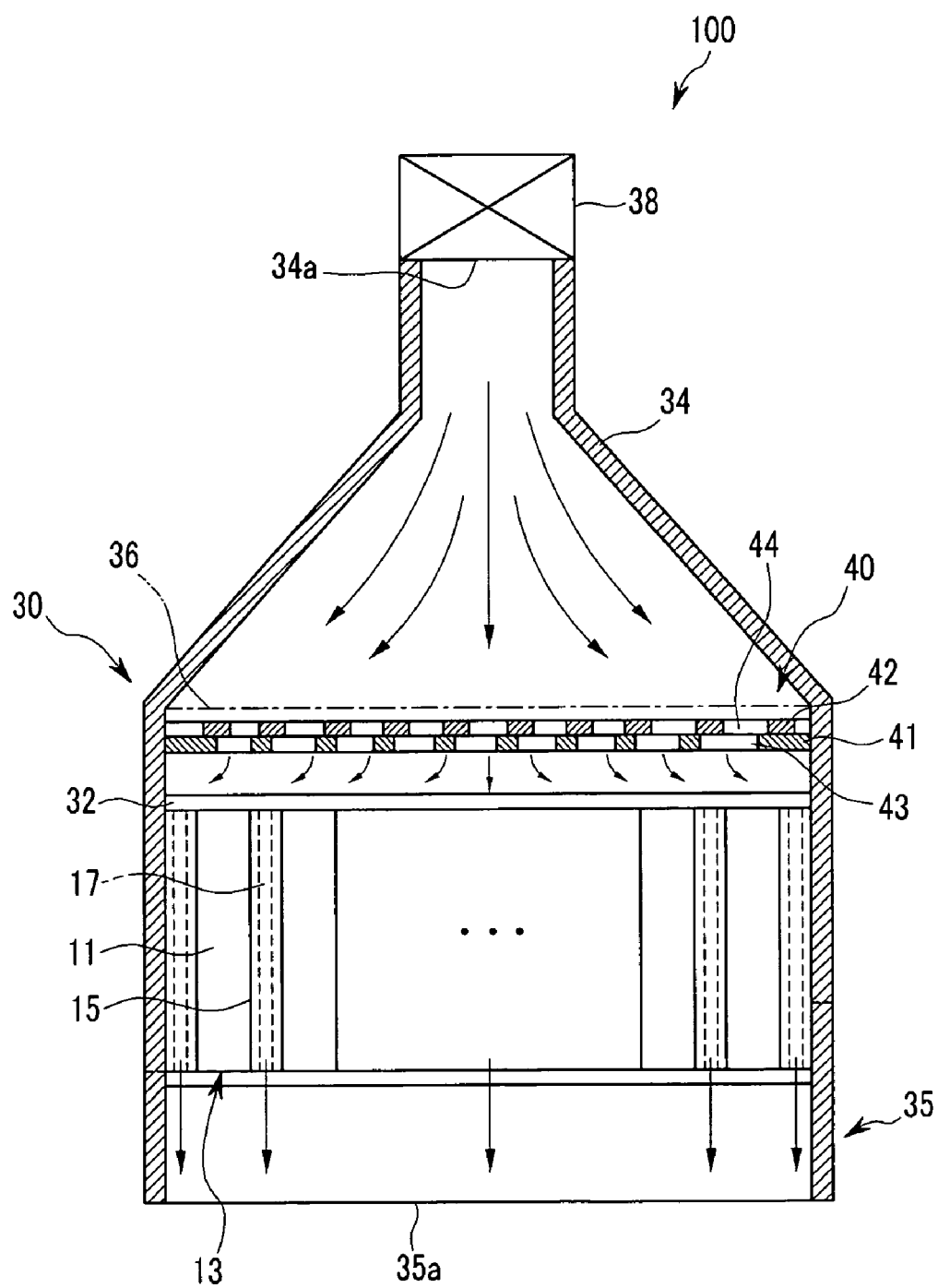
FIG. 2 is a side cross sectional view schematically showing the construction of the battery module according another embodiment of the present invention.

Referring to FIG. 1 and FIG. 2, a battery module 100 is a high-capacity battery module, and includes a plurality of unit batteries 11 which are arranged at predetermined intervals.

Each of the unit batteries 11 has an electrode assembly, which has a positive electrode, a negative electrode, and a separator interposed between the positive electrode and the negative electrode. In the present embodiment, the unit batteries 11 have a substantially rectangular shape (having a pair of long sides and a pair of short sides in the present embodiment).

Between the respective unit batteries 11, battery barrier ribs 15 are disposed to support the side face of the respective unit batteries 11 while maintaining intervals between these unit batteries Circulation paths 17 are formed in the respective battery barrier ribs 15 to allow a heat transfer medium to circulate between these respective unit batteries 11.

Accordingly, in the battery module 100 according to the present embodiment, a plurality of unit batteries 11 are separated from each other with the battery barrier ribs 15 therebetween to form a unit battery pack 13.

The battery module 100 includes a housing 30 having the unit batteries 11 and the battery barrier ribs 15 built therein. Further, the housing 30 functions as a cooling system which cools the heat generated in the respective unit batteries 11 by circulating the heat transfer medium in the circulation paths 17 between the unit batteries 11.

A mount part 32 for supporting the unit batteries 11 is formed in the housing 30 so as to fix the positions of the unit batteries 11.

The housing 30 functions as a passage through which the heat transfer medium circulates, and includes an inflow part 34 into which the heat transfer medium flows and an outflow part 35 from which the heat transfer medium is discharged.

The inflow part 34 includes an inlet 34a into which the heat transfer medium flows, and is constructed such that a flow area gradually increases in a direction from the inlet 34a to the inside of the housing 30.

The outflow part 35 includes an outlet 35a such that the heat transfer medium which has passed through the circulation paths 17 between the respective unit batteries 11 is discharged in the same direction as the inflow direction of the heat transfer medium.

Figure 4:
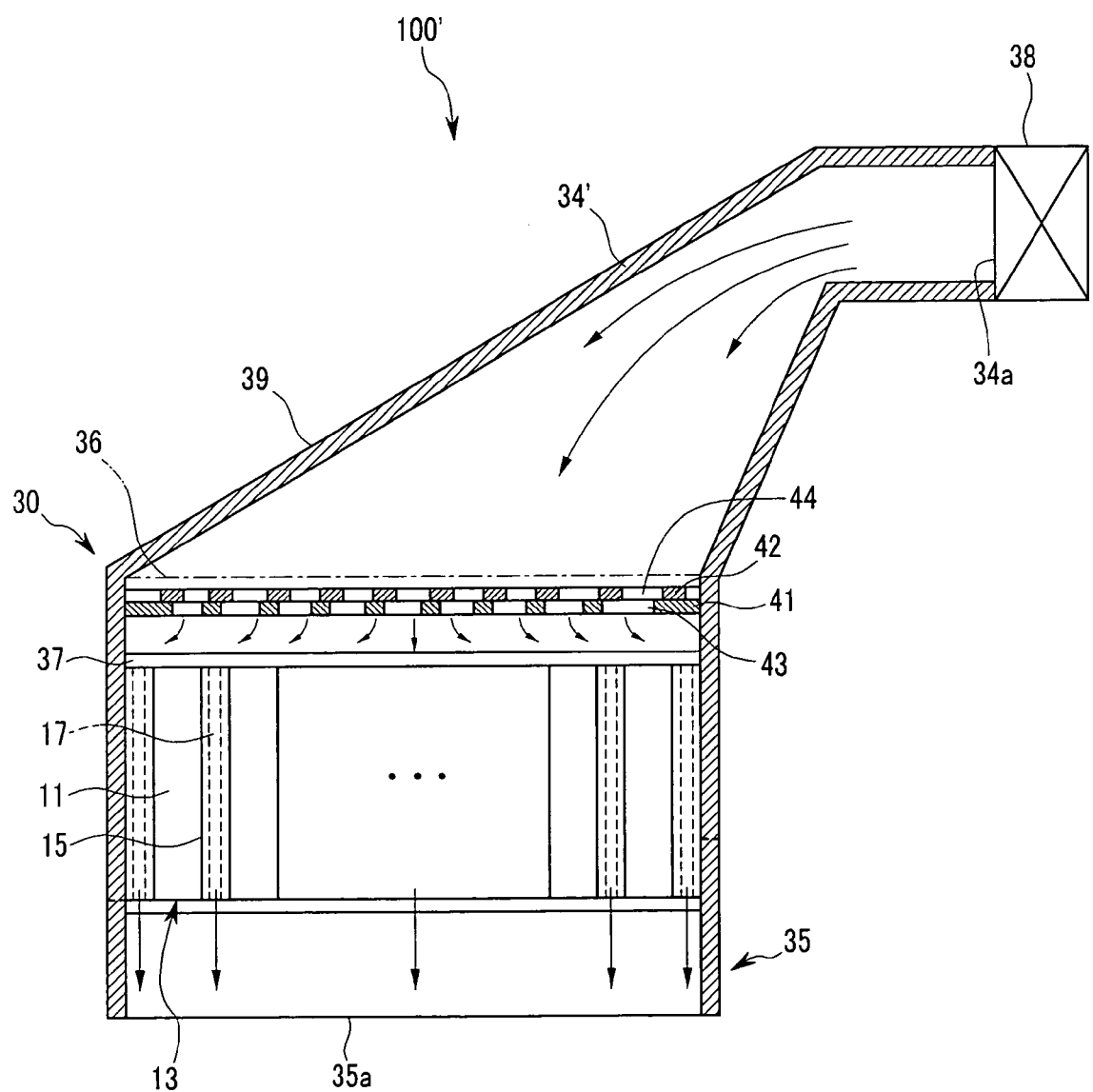
FIG. 4 is a side cross sectional view schematically showing a unit battery pack construction of the battery module according to another embodiment of the present invention.

As shown in FIG. 4, the inflow part 34' of the battery module 100' may be formed bent in one direction, and as shown in FIG. 2, the outflow part 35 may be formed in the same direction as the circulation path.

Therefore, the heat transfer medium which flows in the inflow part 34' through the inlet 34a flows slowly since the heat transfer medium spreads as the flow area increases. Further, when the heat transfer medium is spreading, the density of the heat transfer medium becomes decreased as the heat transfer medium flows from the center of the housing to the edge thereof. Thus, the further the heat transfer medium moves to the edge, the slower the flow velocity of the heat transfer medium becomes.

In the battery module 100 according to FIG. 2, the sectional area of the circulation paths 17 is constant, and the flow velocity of the heat transfer medium which flows in the inflow part 34 through the inlet 34a gradually decreases as the heat transfer medium flows from the center of the unit battery pack 13 to the outside. Therefore, the quantity of the heat transfer medium which passes though the circulation paths 17 between the respective unit batteries 11 gradually becomes decreased as the heat transfer medium flows from the center of the unit battery pack 13 to the outside.

Therefore, the quantity of the heat transfer medium which passes through the circulation paths 17 between the respective unit batteries 11 does not stay constant with respect to the unit battery pack 13, which prevents the temperature of the unit battery pack 13 from being uniform over the entire region of the unit battery pack 13.

The battery module 100 of the present invention provides a flow control unit 40 which is disposed inside the housing 30 to control the flow quantity of the heat transfer medium circulating in the circulation paths 17 between the respective unit batteries 11.

The flow control unit 40 includes a plurality of holes (also referred to hereinafter as nozzle holes) through which the heat transfer medium passes. The size of the holes varies in the flow control unit 40 so that a constant quantity of the heat transfer medium can circulate in the circulation paths 17 between the respective unit batteries 11. The flow control unit 40 in this embodiment includes first and second dispersion plates 41 and 42 arranged at the inflow part 34.

Referring to FIG. 2 and FIGS. 3A to 3C, a dispersion plate 41 is formed in a rectangular plate shape covering the unit battery pack 13. The dispersion plate 41 is integrally disposed in the inflow part 34 of the housing 30 or is combined with the inflow part 34 and fixedly disposed therein so as to be adjacent to the unit battery pack 13 in the housing 30.

The first dispersion plate 41 functions as a so-called diffuser which disperses the heat transfer medium, whose quantity varies depending on the location of the respective unit batteries 11, into the circulation paths 17 between the respective unit batteries 11.

In other words, the first dispersion plate 41 functions as a first heat transfer medium induction means which disperses and distributes the heat transfer medium. This distribution controls temperature flow into the inflow part 34 through the inlet 34a so as to eventually supply a constant quantity of the heat transfer medium into the circulation paths 17 between the respective unit batteries 11.

The first dispersion plate 41 has a plurality of first nozzle holes 43 for passing the heat transfer medium flowing into the inflow part 34 through the inlet 34a through the first nozzle holes 43.

In the present embodiment, the size of the nozzle holes 43 gradually increases in a direction from the inflow center of the heat transfer medium to the outside. The nozzle holes 43 may be formed in a circular, an elliptical, or a polygonal shape. In the embodiments shown in FIGS. 3A-3C, the nozzle hole 43 is formed in a circular shape.

Further, the first dispersion plate 41 is disposed so as to obstruct the heat transfer medium flowing into the inflow part 34 through the inlet 34a, and the size of the nozzle holes 43 gradually increases in a direction from the center portion of the unit battery pack 13 to the outside.

Here, the first nozzle holes 43 are plurally disposed in locations corresponding to the respective circulation paths 17, and may be continuously disposed at predetermined intervals or may be irregularly disposed. In addition, instead of the first nozzle holes, single holes may be disposed in locations corresponding to the respective circulation paths 17.

Figure 3A:
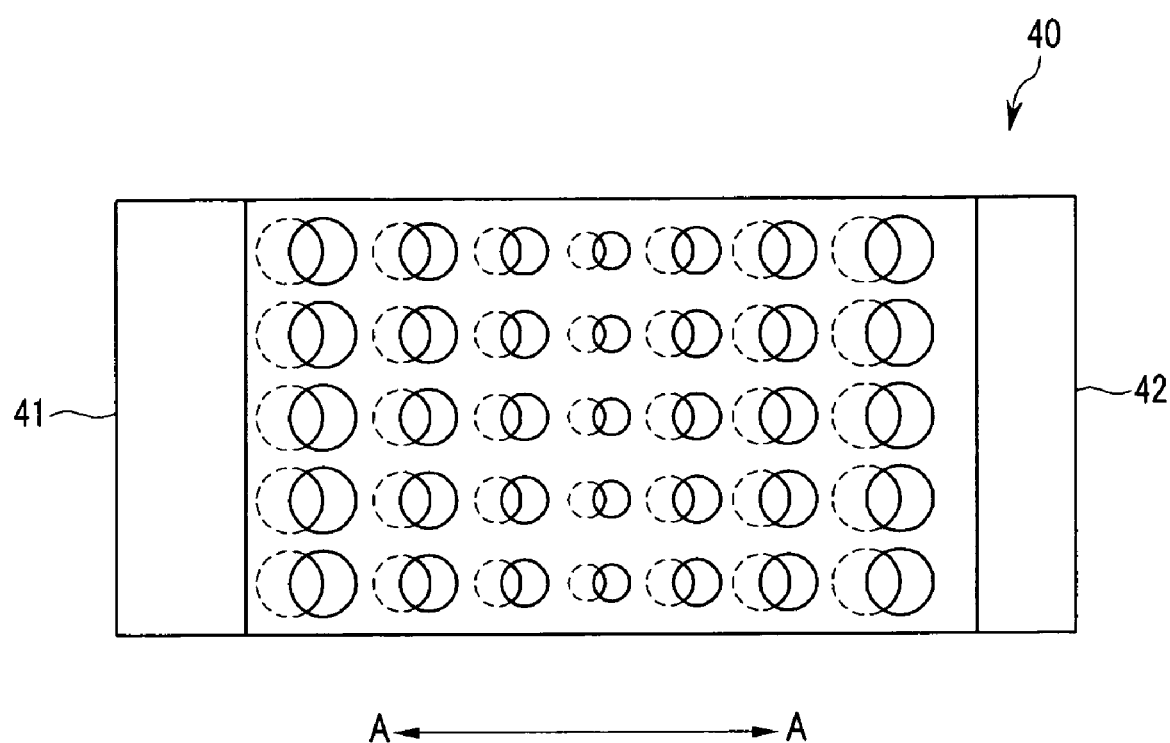
FIG. 3A is a schematic plan view of a flow control unit according to the embodiment shown in FIG. 2.

A second dispersion plate 42 according to the present embodiment is formed in a rectangular plate shape which corresponds to the first dispersion plate 41, and overlaps the first dispersion plate 41 so as to slide on the first dispersion plate 41. As shown in FIG. 3A, the second dispersion plate 42 may slide in a length direction A of the first dispersion plate 41. For this, the second dispersion plate 42 has the same width as the first dispersion plate 41 and has a length smaller than the first dispersion plate 41.

As indicated by a dashed line in FIG. 2, a guide member 36 for substantially guiding the sliding of the second dispersion 42 is disposed in the inflow part 34 of the housing 30. The guide member 36 includes protrusions which protrude from the inflow part 34 to guide the second dispersion plate 42 in a slide direction, such as in the length direction (A in FIG. 3A) of the first dispersion plate 41. Therefore, as shown in FIG. 3A, the second dispersion plate 42 slides back and forth on the first dispersion plate 41 in the length direction A, as an outer peripheral portion of the second dispersion plate 42 is guided by the guide member 36 in a state of contact with the top face of the first dispersion plate 41.

Figure 3B:
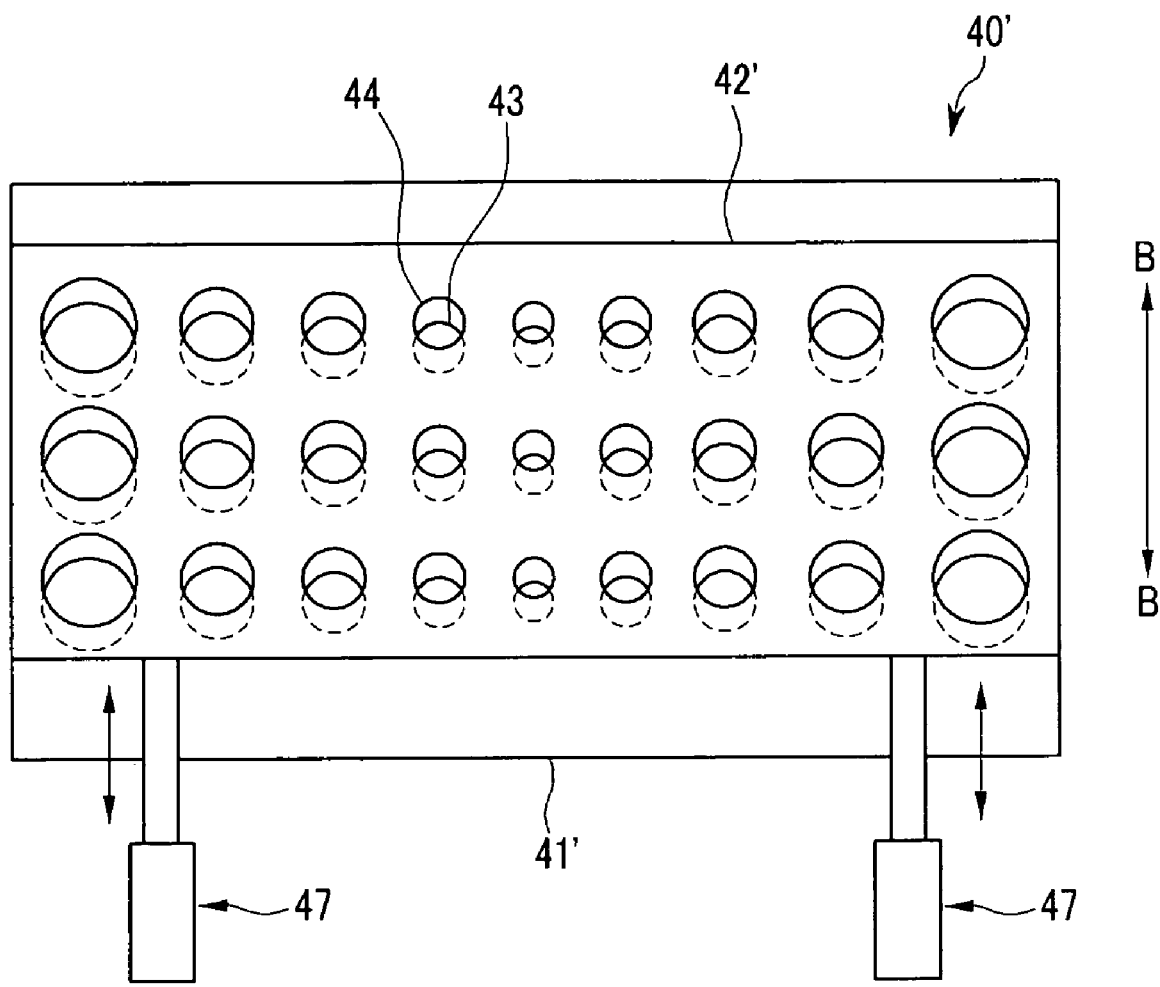
FIG. 3B is a schematic plan view of a flow control unit according to another embodiment of the present invention.
Figure 3C:
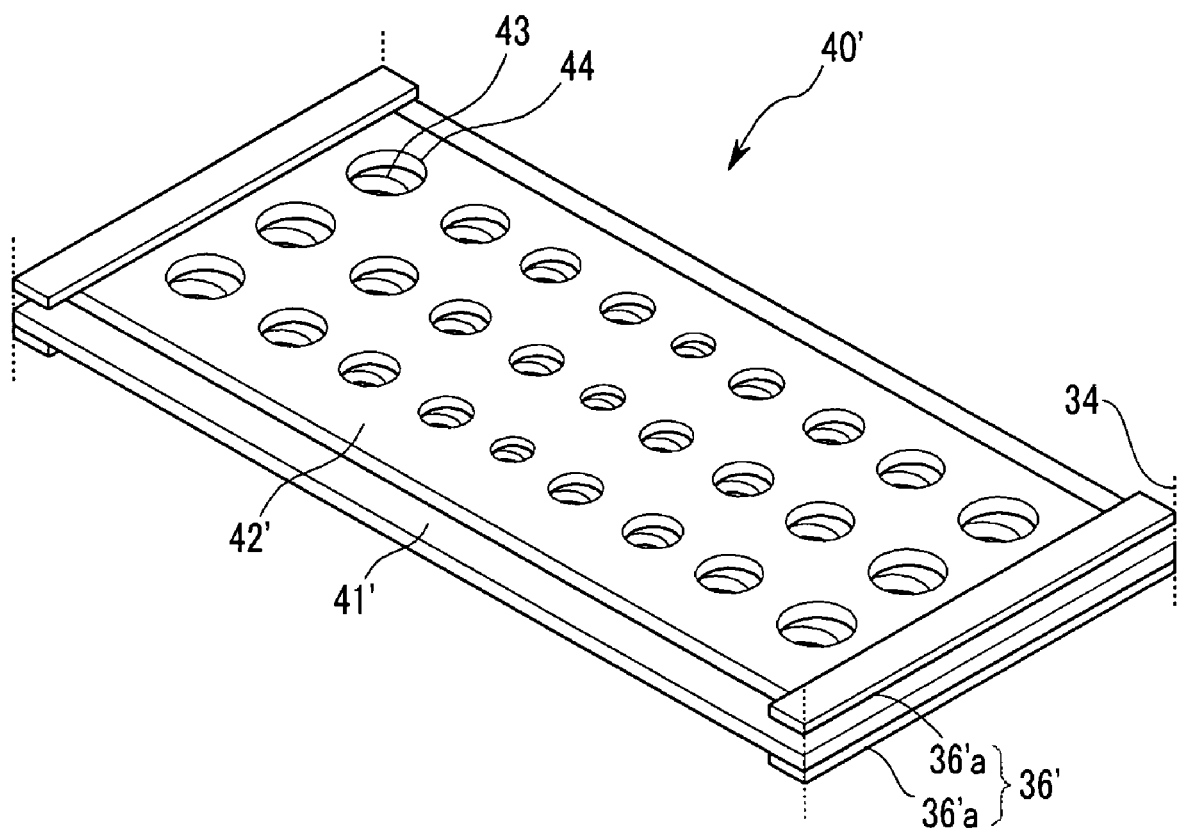
FIG. 3C is a schematic perspective view of the flow control unit shown in FIG. 3B and a guide member according to an embodiment of the present invention.

As shown in FIG. 3B the second dispersion plate 42' of the flow control unit 40' may alternately slide on the first dispersion plate 41' in a width direction B. For this reason, the second dispersion plate 42' has the same length as the first dispersion plate 41' and has a width smaller than the first dispersion plate 41'.

In the present embodiment, the flow control unit 40' may further include actuating member 47 which actuates the second dispersion plate 42'. The actuating member 47 according to the present embodiment is an electronic actuator, but the invention is not limited thereto, as various actuating units may be applied as the actuating member.

As described above and as indicated in FIG. 3C, the guide member 36', which substantially guides the second dispersion plate 42' to slide, is disposed in the inflow part 34 of the housing 30. The guide member 36' is formed of protrusions 36'a which protrude from the inflow part 34 to guide the second dispersion plate 42' in the slide direction, that is, in the width direction of the first dispersion plate 41'. Therefore, the second dispersion plate 42' slides on the first dispersion plate 41' in the width direction B along the guide member 36' in a state of contact with the top face of the first dispersion plate 41'.

As shown in FIGS. 2, and 3A through 3C, the second dispersion plate 42, 42' having the above-described structures functions as a diffuser which disperses the heat transfer medium, whose quantity varies depending on the location of the respective unit batteries 11, into the circulation paths 17 between the respective unit batteries 11, in the same manner as the first dispersion plate 41, 41'.

In other words, the second dispersion plate 42, 42' functions as a second heat transfer medium induction means which disperses the heat transfer medium for controlling temperature flowing into the inflow part 34 through the inlet 34a so as to eventually supply a constant quantity of the heat transfer medium into the circulation paths 17 between the respective unit batteries 11.

The second dispersion plate 42, 42' has second nozzle holes 44 for passing the heat transfer medium flowing into the inflow part 34 through the inlet 34a. In the embodiments described above, the size of the second nozzle holes 44 gradually increases toward the periphery of the inflow.

The second nozzle holes 44 may be formed in a circular, an elliptical or a polygonal shape.

Further, in the second dispersion plate 42, 42', the size of the second nozzle holes 44 gradually increases in a direction from the center portion of the unit battery pack 13 to the outside. In other words, the size of the second nozzle holes 44 gradually becomes smaller in a direction from a portion which corresponds to the circulation path 17 of the battery barrier rib 15 located at the outermost portion of the unit battery pack 13 to a portion which corresponds to the circulation path 17 of the battery barrier rib 15 located at the center portion of the unit battery pack 13. As shown, the second nozzle holes 44 are plurally disposed in locations corresponding to the respective circulation paths 17, and the number and size of the second nozzle holes 44 correspond to those of the first nozzle holes 43.

The second nozzle holes 44 may be disposed at predetermined intervals or may be irregularly disposed. Alternatively, single holes may be disposed at locations corresponding to the respective circulation paths 17. The differences between the nozzle holes 44 from the outside of the second dispersion plate 42 to the center thereof may vary. In one embodiment, the nozzle holes 44 have sectional areas inversely proportional to the flow velocity which gradually decreases in a direction from the center portion of the unit battery pack 13 to the outside, so that the quantity of the heat transfer medium passing through the second nozzle holes 44 is constant when continuity equation of fluid dynamics is considered.

Therefore, since the flow velocity of the heat transfer medium which flows into the center portion of the unit battery pack 13 is large in general, the sectional area of the first and second nozzle holes 43 and 44 which correspond to the center portion of the unit battery pack 13 is adjusted. The further to the outside of the unit battery pack 13 the heat transfer medium flows, the slower the flow velocity of the heat transfer medium gradually becomes. Therefore, sectional areas of the first and second nozzle holes 43 and 44 which correspond to the portions toward the outside of the unit battery pack 13 are adjusted to gradually become larger, so that the first and second nozzle holes 43 and 44 have sectional areas inversely proportional to the flow velocity of the heat transfer medium passing through the first and second nozzle holes 43 and 44.

Besides the structure of the above inflow part 34, the size of the first and second nozzle holes 43 and 44 can be selectively adjusted depending on a driving condition of the battery module 100, a flow condition of the heat transfer medium for controlling temperature, and a climate condition.

In above-described embodiments of the present invention, the second dispersion plate 42, 42' has a single plate capable of sliding on the first dispersion plate 41, 41'; however, the structure is not limited thereto. The second dispersion plate 42, 42' may have two or more plates.

Referring again to FIG. 2, a heat transfer medium supply part 38 for supplying the heat transfer medium into the housing 30 is disposed at the inlet 34a of the housing 30 so as to absorb the heat transfer medium with a predetermined rotational force. Further, the heat transfer medium supply part 38 includes a fan (not shown) having a typical structure which jets the heat transfer medium into the housing 30 through the inlet 34a.

The above-described heat transfer medium supply part 38 is not limited to having such a fan, however. The heat transfer medium supply part 38 may further include a pump or blower which fans the heat transfer medium.

In the battery module 100 of FIG. 2, the heat transfer medium for controlling temperature flows into the housing 30 along the height direction of the respective unit batteries 11 through the inlet 34a by the heat transfer medium supply part 38.

Since the heat transfer medium has a duct shape in which a sectional area of the inflow part 34 gradually increases in the direction from the inlet 34a to the unit battery pack 13, the flow velocity of the heat transfer medium gradually becomes smaller in the direction from the center portion of the unit battery pack 13 to the outside.

While the heat transfer medium flows, the heat transfer medium circulates into the circulation paths 17, passing through the first and second nozzle holes 43 and 44. As the second dispersion plate 42 slides on the first dispersion plate 41, the first and second dispersion plates 41 and 42 are arranged so that the first and second nozzle holes 43 and 44 correspond to each other.

Since the size of the first and second nozzle holes 43 and 44 of the first and second dispersion plates 41 and 42 gradually increases in the direction from the center portion of the unit battery pack 13 to the outside, the first and second nozzle holes 43 and 44 have sectional areas inversely proportional to changes of the flow velocity of the heat transfer medium. Accordingly, a constant quantity of the heat transfer medium can pass through the first and second nozzle holes 43 and 44.

Therefore, the battery module 100 can allow a constant quantity of the heat transfer medium to pass through the circulation paths 17 between the unit batteries 11 corresponding to the first and second nozzle holes 43 and 44. While the heat transfer medium flows, the heat generated in the respective unit batteries 11 is exchanged with the heat transfer medium, the heat transfer medium which is exchanged with the heat escapes from the circulation paths 17 and is discharged through the outlet 35a.

When the quantity of the heat transfer medium passing through the first and second nozzle holes 43 and 44 does not stay constant due to a driving condition of the battery module 100, the flow condition of the heat transfer medium for controlling temperature, and the climate condition, the second dispersion plate 42 is slid on the first dispersion plate 41 in the width or length direction. Then, while the second dispersion plate 42 is in contact with the top face of the first dispersion plate 41, the second dispersion plate 42 is guided by the guide member 36 so as to slide on the first dispersion plate 41 in the width or length direction of the first dispersion plate 41.

Therefore, the sectional area of the first and second holes 43 and 44 of the first and second dispersion plates 41 and 42 varies depending on the movement of the second dispersion plate 42, and thus a constant quantity of the heat transfer medium can pass through the first and second nozzle holes 43 and 44.

In the present embodiment, a constant quantity of the heat transfer medium can pass through the circulation paths 17 between the unit batteries 11 corresponding to the first and second nozzle holes 43 and 44. Accordingly, the heat generated in the respective unit batteries 11 can be evenly distributed so as to be cooled, and thus a constant temperature can be sustained over the entire area of the unit battery pack 13.

Figure 5:
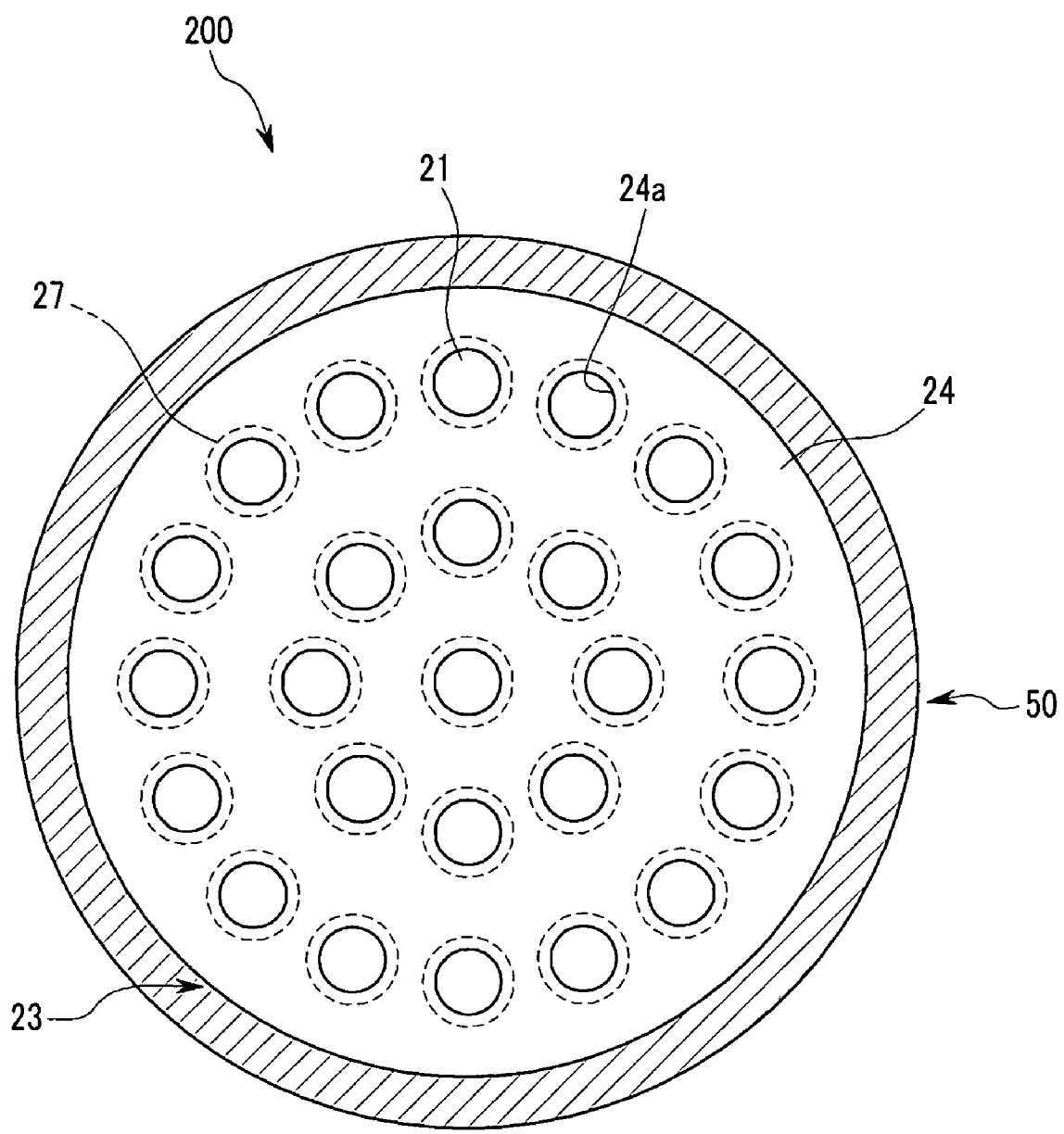
FIG. 5 is a schematic plan view of a battery module according to another embodiment of the present invention.

Referring to FIG. 5, a battery module 200 has a structure in which the respective unit batteries 21 are formed in a cylindrical shape and a constant quantity of the heat transfer medium is circulated into the circulation paths 27 between the respective unit batteries 21.

Therefore, the unit batteries 21 are continuously or irregularly disposed separately from each other by a package part 24, to be further described below, so as to form a unit battery pack 23 having a circular external appearance.

The package part 24 has a circular case for integrally packaging the unit batteries 21, and is formed of materials having insulating properties and relatively high thermal conductivity.

Insertion holes 24a, in which the respective unit batteries 21 are inserted so as to be substantially fixed, are formed in the package part 24. The circulation paths 27 for circulating the heat transfer medium for controlling temperature are formed between and surrounding the respective unit batteries 21.

The battery module 200 according to the present embodiment includes a cylindrical housing 50 having the unit battery pack 23 built therein. Since the construction of the housing 50 is substantially the same as the housing according to the embodiments described above, a detailed description will be omitted.

Figure 6:
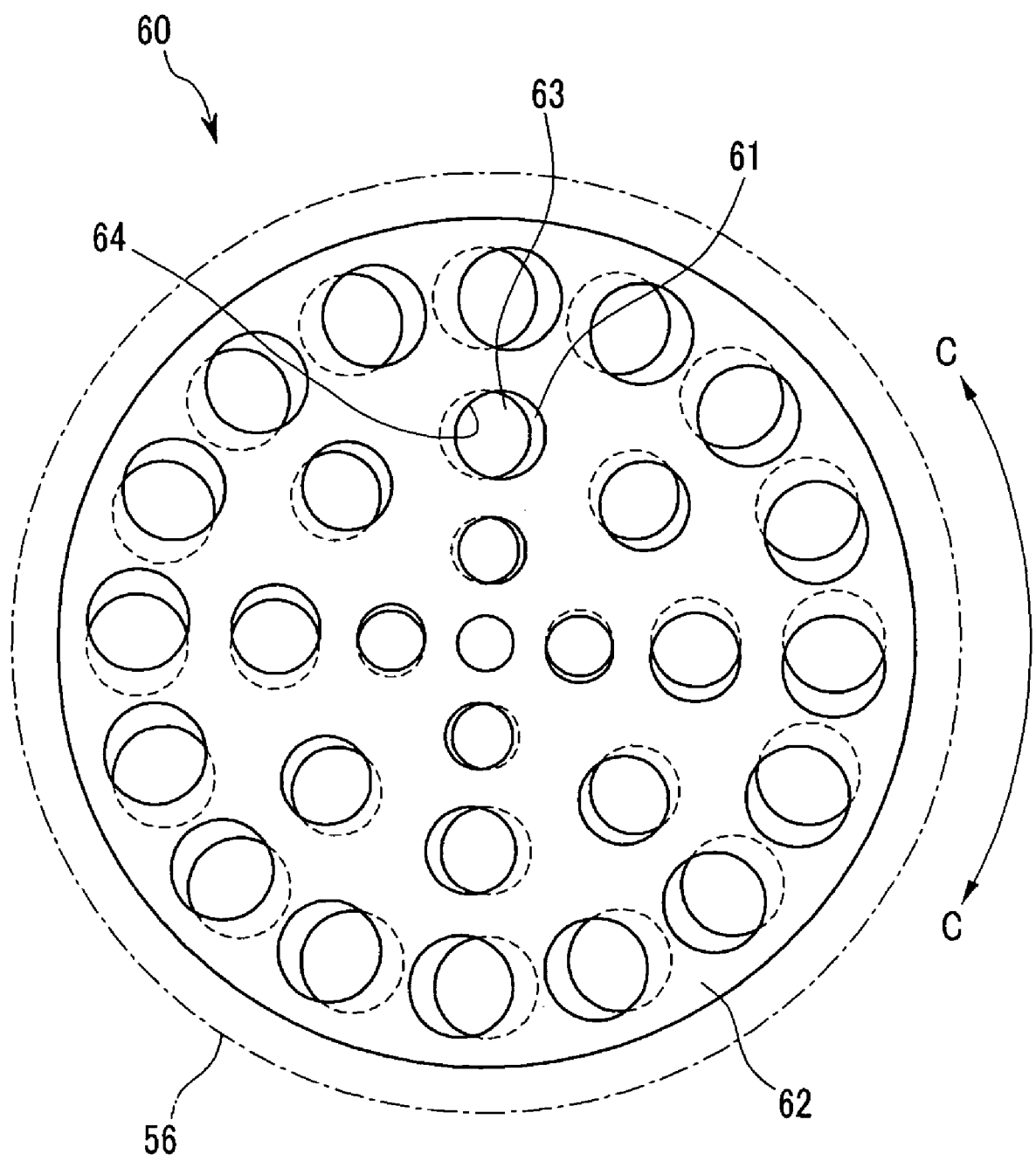
FIG. 6 is a plan view of the flow control unit of the battery module according to another embodiment of the present invention.

FIG. 6 is a schematic plan view of a flow control unit of the battery module described in FIG. 5.

Referring to FIG. 5 and FIG. 6, the battery module 200 having the above-described structure includes a flow control unit 60 for supplying a constant quantity of the heat transfer medium into the circulation paths 27 between the respective unit batteries 21.

According to this embodiment, the flow control unit 60 includes first and second dispersion plates 61 and 62 formed in a circular plate which corresponds to the size of the unit battery pack 23.

The first dispersion plate 61 is fixedly disposed in the housing 50 so as to be adjacent to the unit battery pack 23. The first dispersion plate 61 has a plurality of first nozzle holes 63 for passing the heat transfer medium flowing into the housing 50 toward the unit battery pack 23. The sectional area of the first nozzle holes 63 gradually increases in the direction from the center portion of the unit battery pack 23 to the outside.

The second dispersion plate 62 is slidably disposed in a circumference direction C of the first dispersion plate 61 in a state of contact with the first dispersion plate 61. As an outer peripheral portion of the second dispersion plate 62 is guided by a guide member 56 (indicated by a virtual line in the drawing), which is disposed to protrude from the housing 50 in the circumference direction, the second dispersion plate 62 rotates in the circumference direction C. A plurality of second nozzle holes 64 for passing the heat transfer medium are formed in the second dispersion plate 62.

The sectional area of the second nozzle holes 64 gradually increases in the direction from the center portion of the unit battery pack 23 to the outside. That is, the sectional area of the first and second nozzle holes 63 and 64 of the first and second dispersion plates 61 and 62 is varied by the rotation of the second dispersion plate 62.

Therefore, the battery module 200 according to this embodiment has a structure in which the sectional area of the first and second nozzle holes 63 and 64 gradually increases in the direction from the center portion of the unit battery pack 23 to the outside even though the flow velocity of the heat transfer medium gradually decreases in the direction from the center portion of the unit battery pack 23 to the outside. Accordingly, a constant quantity of the heat transfer medium can be supplied into the circulation paths 27 between the unit batteries 21 through the first and second nozzle holes 63 and 64.

When the quantity of the heat transfer medium passing through the first and second nozzle holes 63 and 64 is not constant due to the driving condition of the battery module 200, the flow condition of the heat transfer medium for controlling temperature, and the climate condition, the second dispersion plate 62 is rotated in the circumference direction C of the first dispersion plate 61.

Accordingly, as the sectional area of the first and second nozzle holes 63 and 64 of the first and second dispersion plates 61 and 62 varies depending on the rotation of the second dispersion plate 62, the first and second nozzle holes 63 and 64 have the sectional area inversely proportional to the changes of the flow velocity of the heat transfer medium. Therefore, a constant quantity of the heat transfer medium may pass through the first and second nozzle holes 63 and 64.

Since an operation of the battery module 200 according to the present embodiment is substantially the same as that of the former embodiments, a detailed description will be omitted.

Figure 7:
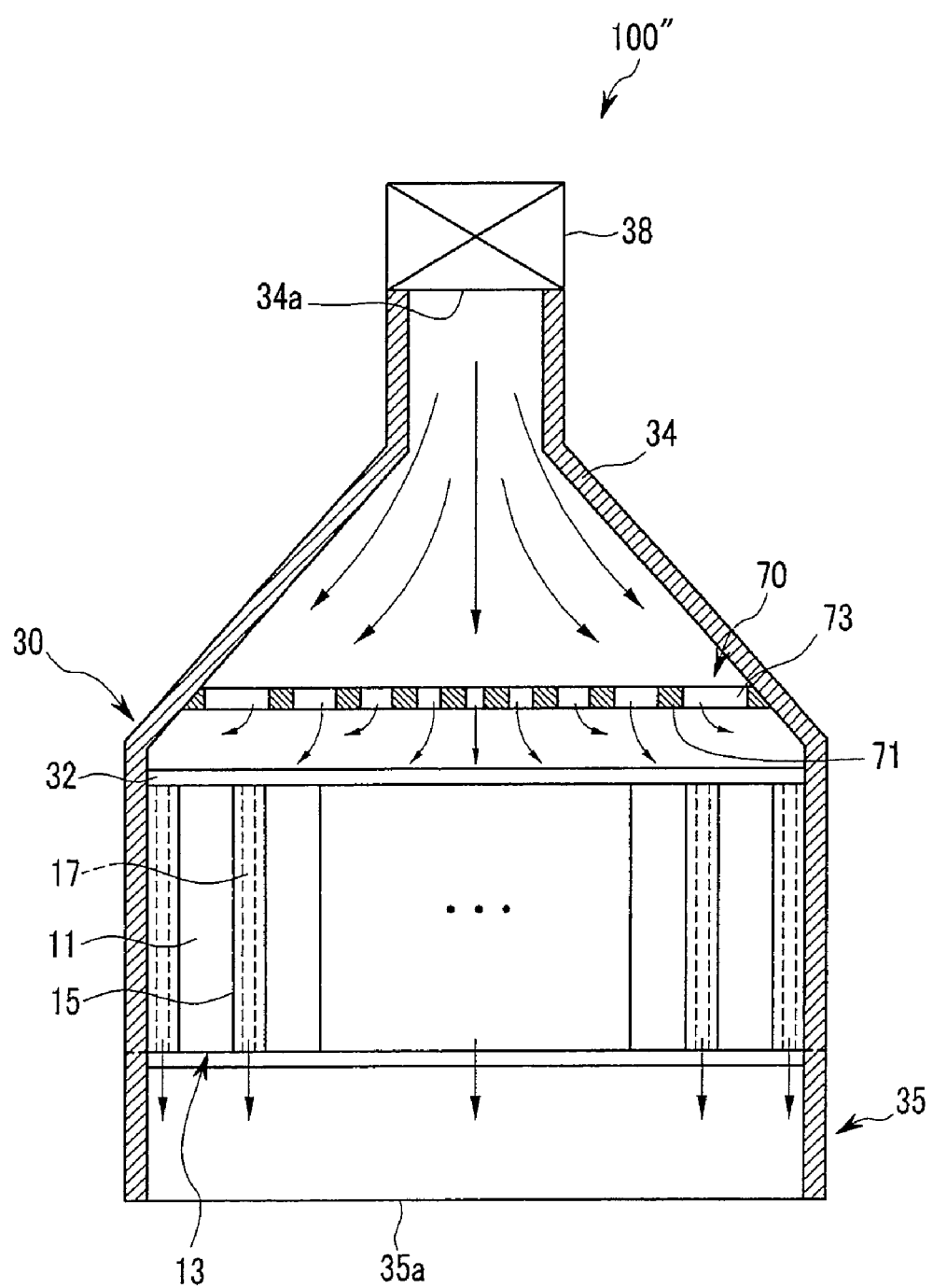
FIG. 7 is a schematic cross sectional view a battery module according to an embodiment of the present invention.

FIG. 7 is a side cross sectional view schematically showing the unit battery pack construction of the battery module according to another embodiment of the present invention.

Figure 8:
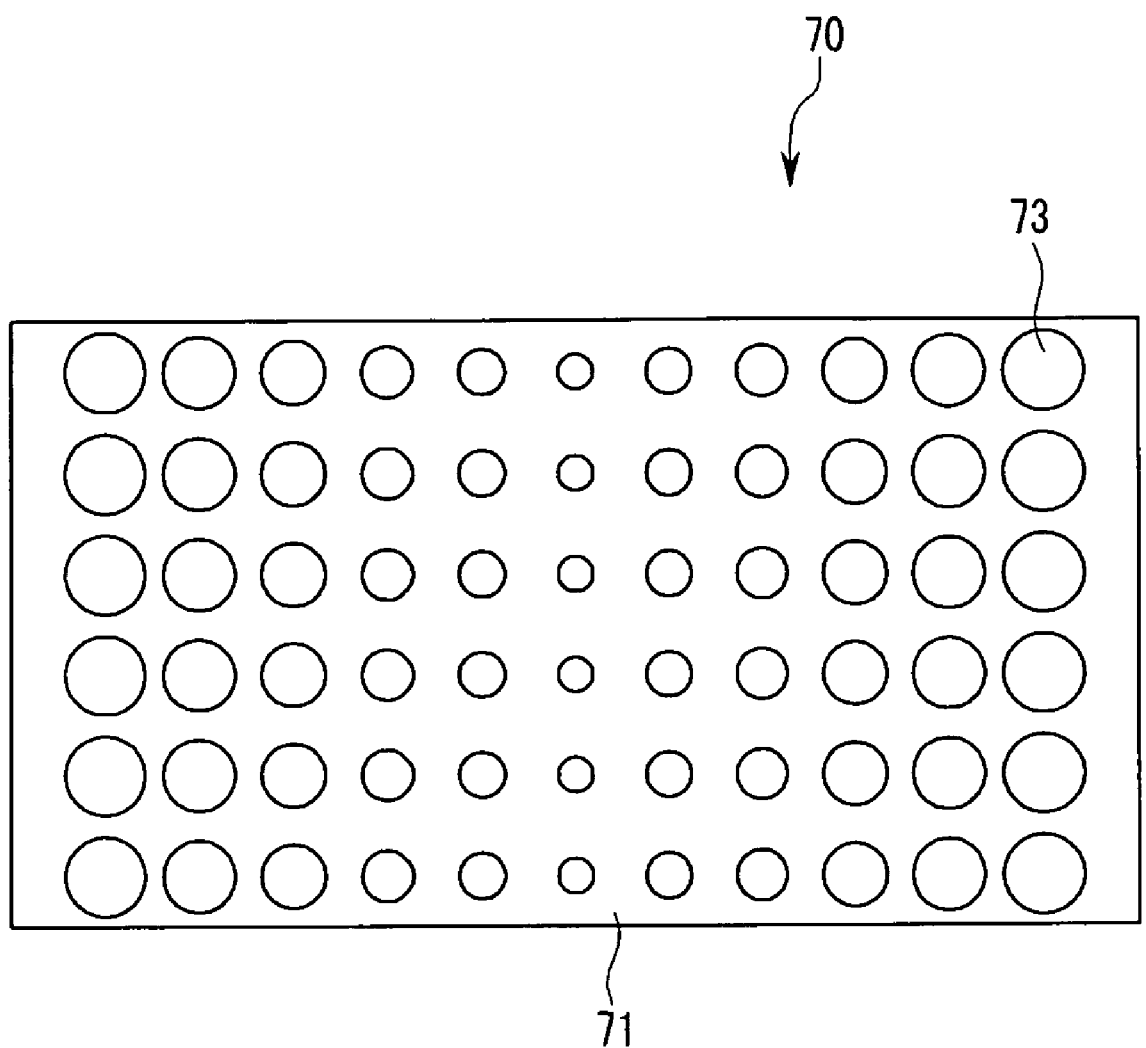
FIG. 8 is a plan view of the flow control unit of the battery module according to another embodiment of the present invention.

Referring to FIG. 7 and FIG. 8, a battery module 100" includes a flow control unit 70 made of one plate. The flow control unit 70 is formed in a rectangular plate shape which corresponds to the size of the unit battery pack 13.

The flow control unit 70 has a dispersion member 71 which is integrally disposed in the inflow part 34 of the housing 30 or is combined with the inflow part 34 and fixedly disposed therein so as to be adjacent to the unit battery pack 13 in the housing 30.

The heat transfer medium dispersion member 71 has a plurality of nozzle holes 73 for passing the heat transfer medium flowing into the inflow part 34 through the inlet 34a. The size of the nozzle holes 73 gradually increases in the direction from portions corresponding to the inflow center of the heat transfer medium to the outside.

The nozzle holes 73 may be formed in a circular, an elliptical, or a polygonal shape. However, the nozzle holes 73 are shown formed in a circular shape.

Therefore, even though the heat transfer medium flowing in the inflow part 34 is not evenly distributed to the outside due to an enlarged sectional area, the dispersion member 71 compulsorily distributes the heat transfer medium so as to evenly cool the unit batteries.

Figure 9:
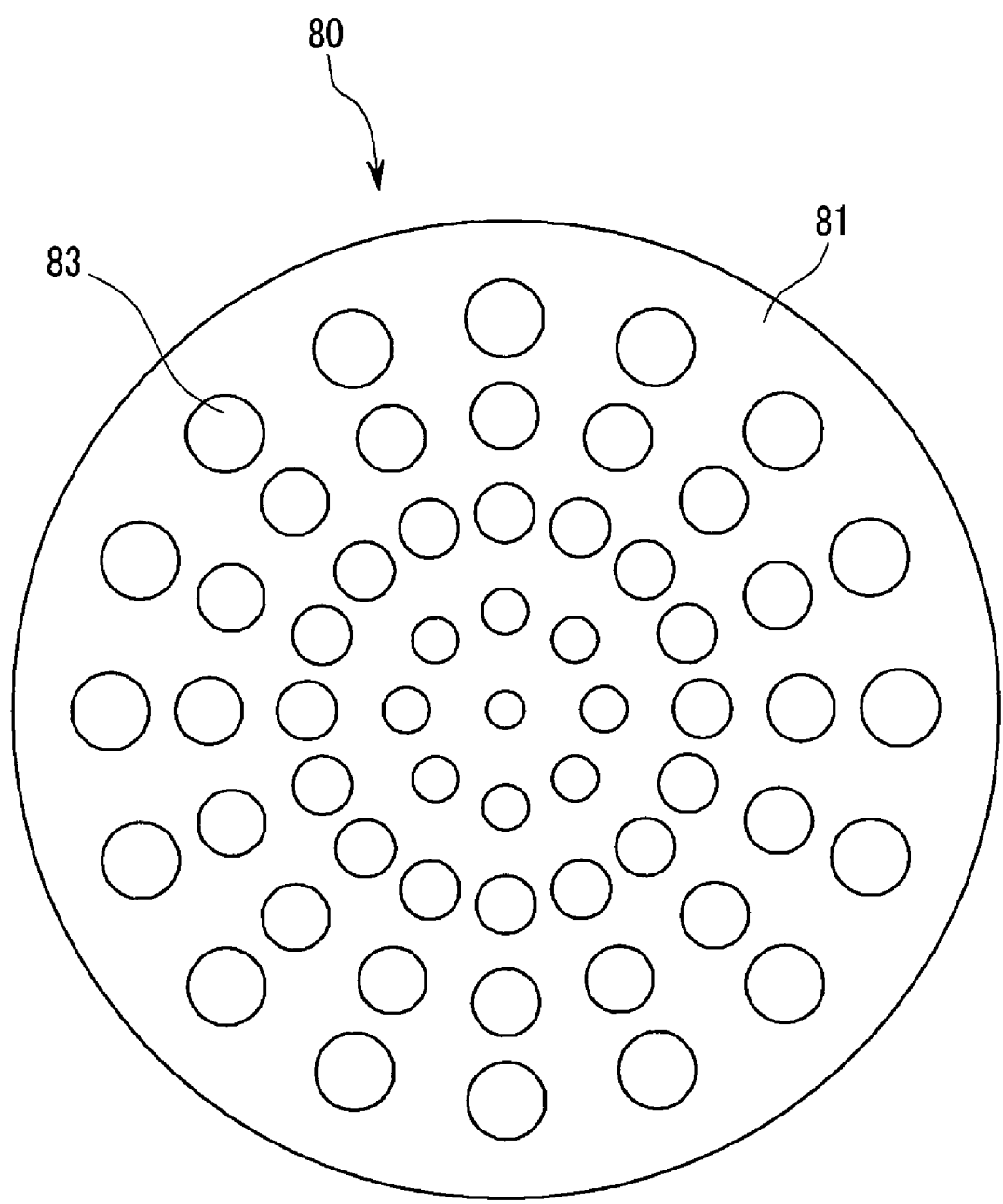
FIG. 9 is a plan view of the flow control unit of the battery module according to yet another embodiment of the present invention.

Referring to FIG. 9, a flow control unit 80 according to another embodiment of the present invention can be applied to the battery module shown in FIG. 5, and is made of one plate member, unlike the flow control unit shown in FIG. 5.

The flow control unit 80 according to the present embodiment includes a heat transfer medium dispersion member 81 formed in a circular plate shape which corresponds to the size of the unit battery pack 23. Such a heat transfer medium dispersion member 81 has a plurality of nozzle holes 83 for passing the heat transfer medium flowing into the housing 50 toward the unit battery pack 23, and the sectional area of the nozzle holes 83 gradually increases in a direction from the center portion of the unit battery pack 23 to the outside.

When the heat transfer medium flows in, the sectional area of the inflow part 34 is enlarged. Therefore, even though the heat transfer medium is not evenly distributed to the outside, the dispersion member 81 compulsorily distributes the heat transfer medium so as to evenly cool the unit batteries.

Figure 10:
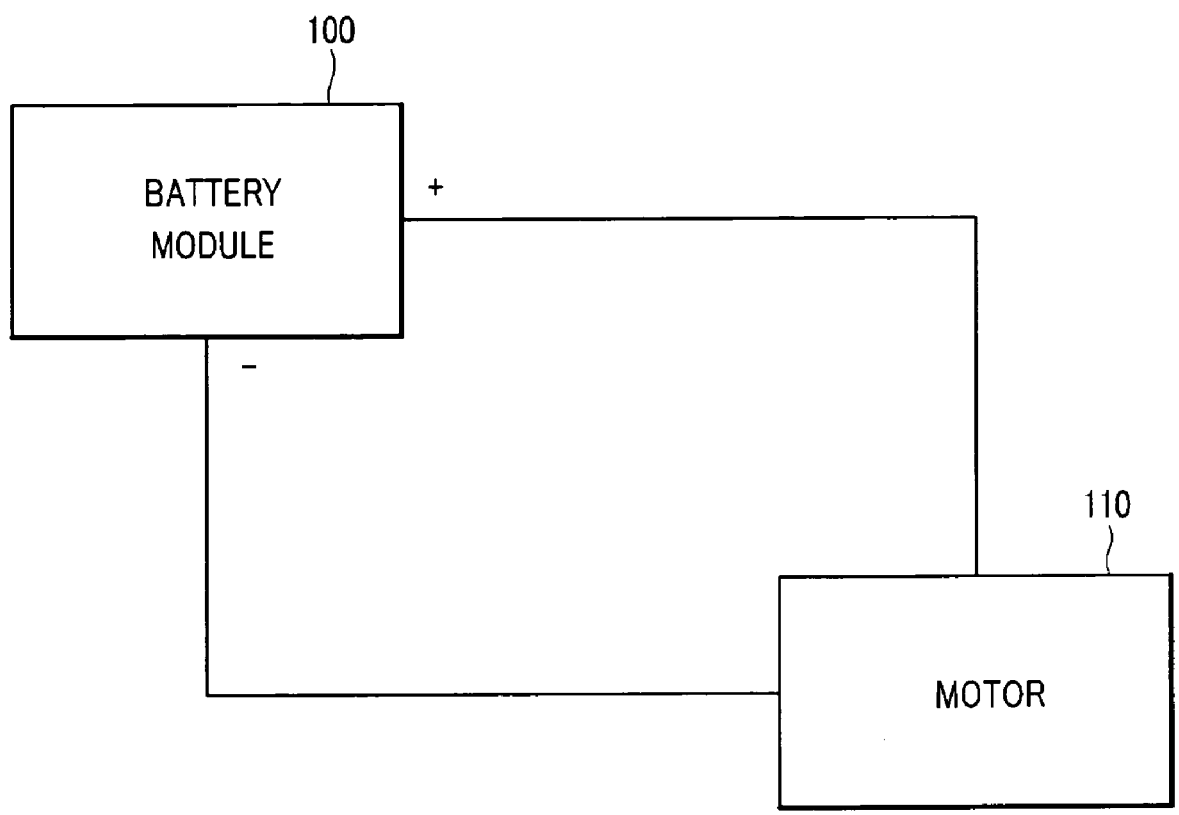
FIG. 10 is a block diagram schematically showing a secondary battery as a power source for driving a motor.

FIG. 10 is a block diagram schematically showing a state in which the battery module 100 shown in FIGS. 2,5 and 7 is connected to a motor 110.

According to various embodiments of the present invention, the flow control unit capable of selectively controlling a cooling heat transfer medium which circulates in the circulation paths between the unit batteries is provided. Therefore, even though there are changes in the inflow structure of the heat transfer medium in the housing, the driving condition of the battery module, the flow condition of the heat transfer medium, and the climate condition, temperature all over the unit battery pack can be made even by smoothly circulating a constant quantity of the heat transfer medium in the circulation paths between the unit batteries.

Therefore, there are effects that optimize the cooling efficiency of the whole unit batteries and improve the charging and discharging efficiency of the battery module.

Here, the above-described secondary battery (or the battery module) can be used as a power source for driving a motor of equipment such as a hybrid electric vehicle (HEV), an electric vehicle (EV), a wireless cleaner, an electric-powered bicycle, an electric-powered scooter or the like.

Even though various examples of embodiments of the invention have been described in detail hereinabove, the invention is not limited to these embodiments. Those skilled in the art will appreciate that various modifications and substitutions can be made thereto without departing from the spirit and scope of the present invention as set forth in the appended claims and their equivalents.

What is claimed is:

1. A secondary battery module comprising:
   a unit battery pack having a plurality of unit batteries arranged at intervals;
   a housing having the unit battery pack therein, and a heat transfer medium circulating within the housing for controlling temperature of the plurality of unit batteries;
   a flow control unit in the housing and controlling the flow quantity of the heat transfer medium circulating between unit batteries of the plurality of unit batteries,
   wherein the flow control unit has a plurality of openings for passing the heat transfer medium therethrough, at least one first opening of the plurality of openings having a first selectively adjustable size and at least one second opening of the plurality of openings having a second selectively adjustable size,
   wherein the first selectively adjustable size is different from the second selectively adjustable size.

2. The secondary battery module of claim 1, wherein the flow control unit comprises a dispersion member adapted to variously distribute the heat transfer medium between the unit batteries according to locations of each of the unit batteries.

3. The secondary battery module of claim 1, wherein the flow control unit comprises:
   a heat transfer medium dispersion member in the housing adjacent to the unit battery pack,
   wherein the plurality of openings are in the heat transfer medium dispersion member for passing a flow of the heat transfer medium,
   wherein sizes of respective openings of the plurality of openings gradually increase in a direction from a center of the flow of the heat transfer medium to a periphery of the flow of the heat transfer medium.

4. The secondary battery module of claim 1, wherein the flow control unit comprises a plate member having the plurality of openings, wherein sizes of respective openings of the plurality of openings gradually increase in a direction from a center of the housing to a periphery of the housing.

5. The secondary battery module of claim 1, wherein the unit battery pack further comprises:
   battery barrier ribs separating the unit batteries from each other; and
   circulation paths in the battery barrier ribs for passing the heat transfer medium therethrough between the unit batteries.

6. A secondary battery module comprising:
   a unit battery pack having a plurality of unit batteries arranged at intervals;
   a housing having the unit battery pack therein, and a heat transfer medium circulating within the housing for controlling temperature of the plurality of unit batteries;
   a first dispersion plate fixed in the housing adjacent to the unit battery pack, the first dispersion plate having a plurality of apertures; and
   a second dispersion plate slidable on the first dispersion plate and having a plurality of apertures corresponding to the plurality of apertures of the first dispersion plate and forming a plurality of openings therewith adapted to pass the heat transfer medium therethrough and distribute the heat transfer medium between unit batteries of the plurality of unit batteries,
   wherein the second dispersion plate is selectively slidable on the first dispersion plate for selectively adjusting at least one first opening of the plurality of openings having a first selectively adjustable size and at least one second opening of the plurality of openings having a second selectively adjustable size, and
   wherein the first selectively adjustable size is different from the second selectively adjustable size.

7. The secondary battery module of claim 6, wherein the housing further comprises:
   an inflow part for allowing the heat transfer medium to flow into the unit battery pack in an inflow direction; and
   an outflow part for discharging the heat transfer medium passing through the plurality of unit batteries in a discharge direction,
   wherein the inflow direction of the heat transfer medium coincides with the discharge direction of the heat transfer medium.

8. The secondary battery module of claim 7, wherein the inflow part is formed such that a sectional area of a flow of the heat transfer medium gradually increases toward the unit battery pack.

9. The secondary battery module of claim 7, wherein a flow velocity of the heat transfer medium flowing through the inflow part gradually decreases toward a periphery of the unit battery pack.

10. The secondary battery module of claim 7, wherein the inflow part has a structure adapted to gradually decrease a flow velocity of a flow of the heat transfer medium from a center of the flow to a periphery of the flow.

11. The secondary battery module of claim 6, wherein each of the unit batteries has a prismatic shape.

12. The secondary battery module of claim 11, wherein the first dispersion plate and the second dispersion plate have a rectangular shape.

13. The secondary battery module of claim 12, wherein the second dispersion plate overlaps the first dispersion plate and is slidable on the first dispersion plate in a width direction or a length direction of the first dispersion plate.

14. The secondary battery module of claim 6, wherein the housing further comprises a guide member for guiding movement of the second dispersion plate.

15. The secondary battery module of claim 6, wherein sizes of respective openings of the plurality of openings gradually increase from a center of a flow of the heat transfer medium toward a periphery of the flow of the heat transfer medium.

16. The secondary battery module of claim 6, wherein sizes of respective openings of the plurality of openings gradually increase toward a periphery of the unit battery pack.

17. The secondary battery module of claim 6, wherein sizes of respective openings of the plurality of openings vary depending on a location of the second dispersion plate relative to the first dispersion plate.

18. The secondary battery module of claim 6, wherein each of the unit batteries has a cylindrical shape.

19. The secondary battery module of claim 18, wherein the unit battery pack includes a circular package part for packaging the unit batteries.

20. The secondary battery module of claim 19, wherein the first dispersion plate and the second dispersion plate have a circular shape corresponding to the package part.

21. The secondary battery module of claim 20, wherein the second dispersion plate overlaps the first dispersion plate and is slidable on the first dispersion plate in a circumference direction of the first dispersion plate.

22. A flow control unit for controlling a heat transfer medium flow through passages between unit batteries of a secondary battery module, the flow control unit comprising a plate having a plurality of openings, sizes of respective openings of the plurality of openings increasing toward a periphery of the plate, and at least one first opening of the openings having a first selectively adjustable size and at least one second opening of the openings that is more proximate the periphery of the plate than the first opening having a second selectively adjustable size, wherein the plate is adjacent to the secondary battery module such that the heat transfer medium flow passes through the openings and into the passages between the unit batteries.

23. The secondary battery module of claim 1, further comprising an actuator adapted to selectively adjust the sizes of the at least one first opening and the at least one second opening.

24. The secondary battery module of claim 6, further comprising barrier ribs separating adjacent unit batteries of the plurality of unit batteries from each other, each of the barrier ribs being between two adjacent unit batteries of the plurality of unit batteries and having a circulation path therein for passing the heat transfer medium through the circulation path and between the two adjacent unit batteries.

25. The secondary battery module of claim 6, further comprising an actuator adapted to selectively slide the second plate on the first plate.

26. The flow control unit of claim 22, further comprising an actuator adapted to selectively adjust the sizes of the at least one first opening and the at least one second opening.

27. The secondary battery module of claim 1, wherein the at least one first opening is more proximate at least one peripheral edge of the flow control unit than the at least one second opening.

28. The secondary battery module of claim 6, wherein the at least one first opening is more proximate a periphery of the housing than the at least one second opening.

29. The flow control unit of claim 22, wherein the at least one first opening is more proximate the periphery of the plate than the at least one second opening.

\* \* \* \* \*

UNITED STATES PATENT AND TRADEMARK OFFICE
CERTIFICATE OF CORRECTION

PATENT NO. : 7,642,006 B2
APPLICATION NO. : 11/269020
DATED : January 5, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this

Twenty-first Day of December, 2010

David J. Kappos
*Director of the United States Patent and Trademark Office*